(12) United States Patent
Kaneda et al.

(10) Patent No.: US 6,327,382 B1
(45) Date of Patent: Dec. 4, 2001

(54) IMAGE PROCESSING METHOD AND APPARATUS AND STORAGE MEDIUM THEREFOR

(75) Inventors: Kitahiro Kaneda, Yokohama; Toshiaki Yagasaki, Hino, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/239,015

(22) Filed: Jan. 29, 1999

(30) Foreign Application Priority Data

Jan. 30, 1998 (JP) .................................................. 10-018933

(51) Int. Cl.[7] .............................. G06K 9/00; G06K 9/34
(52) U.S. Cl. .......................... 382/164; 382/176; 382/177; 382/292
(58) Field of Search ..................................... 382/173, 176, 382/180, 224, 164, 177, 170, 171, 172, 270, 271, 272, 273, 292; 358/462, 553, 467, 450; 707/520

(56) References Cited

U.S. PATENT DOCUMENTS 5,949,555 * 9/1999 Sakai et al. ......................... 358/462

* cited by examiner

Primary Examiner—Timothy M. Johnson
(74) Attorney, Agent, or Firm—Fitzpatrick, Cella, Harper & Scinto

(57) ABSTRACT

It is an object of the present invention to appropriately extract areas for character recognition from a color image. It is another object of the present invention to separate and extract characters from a background color in a color image if the background of the manuscript is not white and if the characters are printed in a portion having a color that is not commonly used all over the image. To achieve these objects, this invention binarizes an input color image in a plurality of stages and extracts area from binary images obtained in each stage to enable areas and text sections to be appropriately extracted despite the unknown colors of the characters and background contained in the input color image.

60 Claims, 9 Drawing Sheets

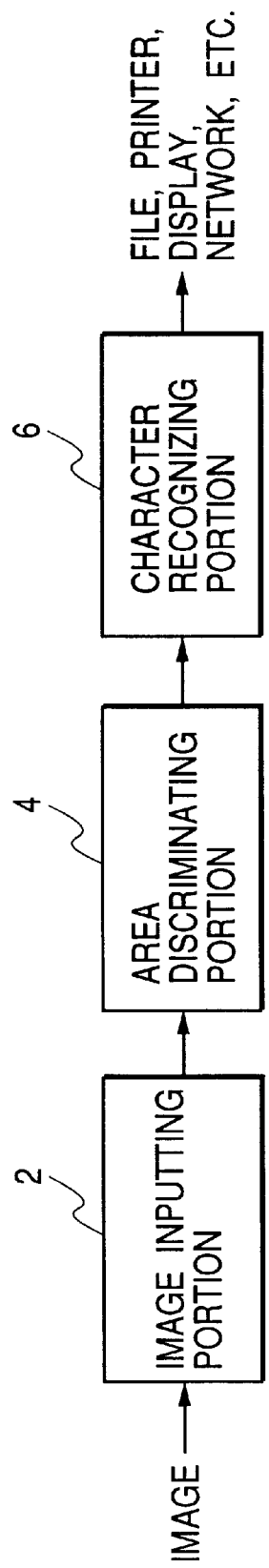

FIG. 2

BLOCK NO : 2
ATTRIBUTE INFORMATION : LINE DRAWING
COLOR INFORMATION : BLACK/SURFACE, GRAY/BACKGROUND
LAYOUT INFORMATION : COORDINATES (1400,0), SIZE (1000,800)
BINARY INFORMATION : BINARY IMAGE BLACK/LINE DRAWING, WHITE/BACKGROUND

BLOCK NO : 1
ATTRIBUTE INFORMATION : TEXT
COLOR INFORMATION : WHITE/SURFACE, BLUE/BACKGROUND
LAYOUT INFORMATION : COORDINATES (0,0), SIZE (1500,2200)
BINARY INFORMATION : BINARY IMAGE BLACK/CHARACTERS, WHITE/BACKGROUND

BLOCK NO : 3
ATTRIBUTE INFORMATION : TEXT
COLOR INFORMATION : BLACK/SURFACE, GRAY/BACKGROUND
LAYOUT INFORMATION : COORDINATES (0,1500) SIZE (1500,700)
BINARY INFORMATION : BINARY IMAGE BLACK/CHARACTERS, WHITE/BACKGROUND

BLOCK NO : 4
ATTRIBUTE INFORMATION : TABLE
COLOR INFORMATION : BLACK/SURFACE, GRAY/BACKGROUND
LAYOUT INFORMATION : COORDINATES (1500,700) SIZE (1500,1500)
BINARY INFORMATION : BINARY IMAGE BLACK/TABLE, WHITE/BACKGROUND

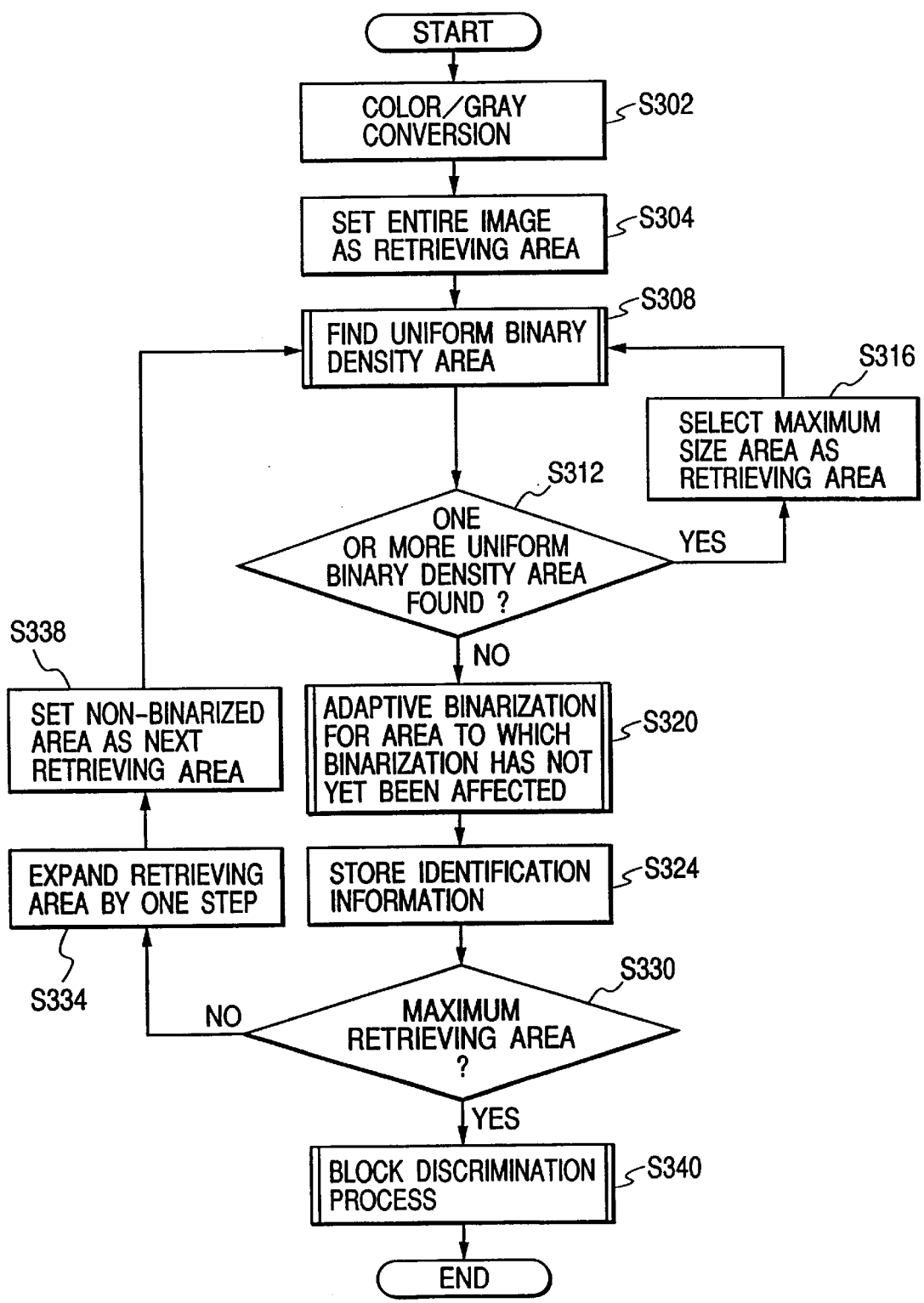

IMAGE PROCESSING METHOD AND APPARATUS AND STORAGE MEDIUM THEREFOR

BACKGROUND OF THE INVENTION

1. Field of the Invention

The present invention relates to the area discrimination or extraction of an input image. The present invention relates to the analysis of a color image. The present invention relates to preprocessing for optical character recognition.

2. Related Background Art

Due to the significantly improved processing performance of computers, documentation tools having a high power of expressions have been developed to facilitate the application of colored and diverse documents.

On the other hand, preprocessing for determining a target area for character recognition, that is, the area discriminating technique is gathering attention as an essential technique for conventional documentation tools, for example, OCRs. This is because the use of colored and diverse documents results in complicated layouts, thereby preventing textual areas from being extracted using a simple demarcating technique.

The above area discriminating technique, however, deals only with black-and-white binary images and does not directly cope with colored images. This also applies to general area discriminating techniques. Thus, no color information is reflected in area discrimination and the concept that colors are used as area attributes does not exist, so color information is totally neglected.

Thus, in view of the spread of colored documents and their complicated layouts, existing area discriminating techniques provide insufficient functions for preprocessing for documentation (text processing).

SUMMARY OF THE INVENTION

The present invention recursively retrieves uniform binary density areas to enable areas of the same background color to be extracted even from documents with a colored background or inverse characters. It also designates retrieving areas of a minimum size to avoid useless retrievals in order to achieve a sufficiently practical processing speed. Furthermore, this invention reliably discriminates a main object, represents it as binary data, and adds a color attribute to it to enable the accuracy of subsequent image conversions to be substantially improved. In particular, this invention enables the true character recognition of colored documents taking color information into account, thereby noticeably contributing to the efficient processing of complicated documents.

BRIEF DESCRIPTION OF THE DRAWINGS

FIG. 1 is a schematic diagram of a process executed by an apparatus according to this invention;

FIG. 2 illustrates the results of area discrimination;

FIG. 3 is a flowchart of area discriminating processing;

DETAILED DESCRIPTION OF THE PREFERRED EMBODIMENTS

Figure 9:
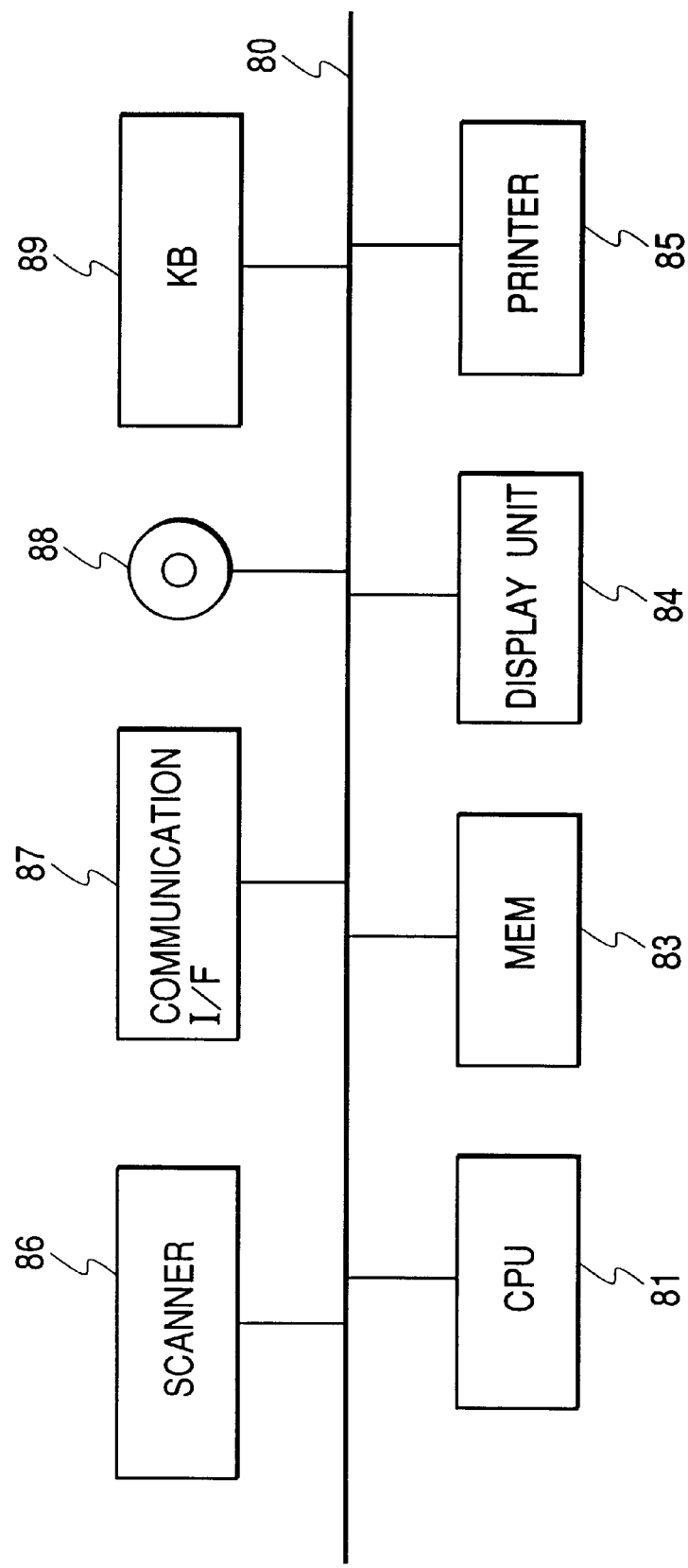
FIG. 9 is a block diagram of an apparatus according to this invention.

FIG. 9 is a block diagram of an apparatus according to this invention.

A CPU (a central processing unit) 81 executes the present processing control according to a control program stored in a MEM 83. The processing shown in the flowchart described below is also executed under the control of the CPU 81 according to the control program stored in the MEM 83. The MEM (consisting of a RAM and a ROM) 83 stores various data such as the control program for processing executed by the CPU 81, various parameters used for the processing, input images, and a dictionary for character recognition. A display unit 84 is composed of a CRT, an LCD, or the like to display input images, texts for the results of processing, operation instruction screens, and the results of recognition read from a file according to document discrimination information instructed by an inputting means 89. The results of character recognition stored in the MEM 83 can be displayed on the display unit 84, and the inputting means 89 can be used to select the correct character from a plurality of candidates. A printer 85 is composed of an LBP, a BJ printer, or the like to print images, texts, and the like. A color scanner 86 optically reads an image from a manuscript to input it to the apparatus as an electric signal. A communication interface 87 controls data transmissions and receptions via a public network, a LAN, or the like. The input of an image according to this invention and the output of the results of the processing of this image can also be transmitted to and from other terminals via the communication interface. A storage medium 88 can be installed in and removed from the present apparatus, and data can be read from or written to the storage medium using a computer. The storage medium 88 is a CD-ROM, a CD-R, a FD, or the like. The image according to this invention may be read from the storage medium 88 and the results of processing may be written to the medium 88. The control program stored in the MEM 83 may be installed from another terminal via the communication interface or from the storage medium 88. An inputting means 89 is composed of a keyboard, a pointing device or the like, and an operator inputs an instruction via the inputting means 89. A bus 80 transmits data among these means.

An embodiment of this invention is described with reference to the drawings. FIG. 1 is a schematic diagram of a process executed by a character recognition apparatus to which this invention is applied.

In FIG. 1, an image inputting portion 2 is implemented by a scanner 86 to input a manuscript image. An area discriminating portion 4 discriminates the areas of the input manuscript image. A character recognizing portion 6 recognizes the characters in the input image. The CPU 81 executes processes for the area discriminating portion 4 and character recognizing portion 6 according to the control program stored in the MEM 83, as shown in the flowchart described below.

Next, the operation will be explained.

Figure 7:
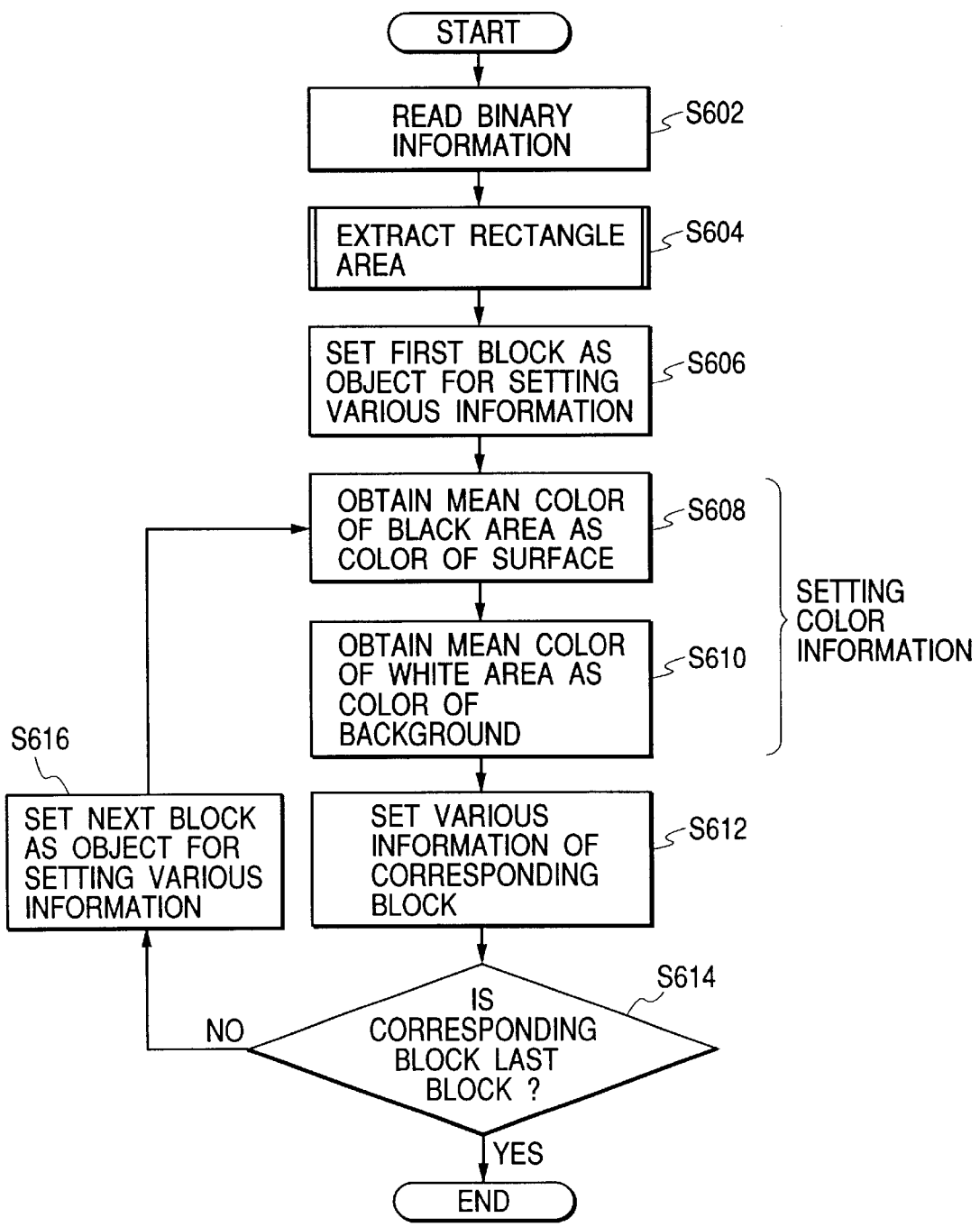
FIG. 7 is a flowchart of block discriminating processing.

A multi-valued image (a color image) of n bits obtained from the image inputting portion 2 is directly input to the area discriminating portion 4 and divided into small areas (hereafter referred to as "blocks") for the respective attributes, for example, as shown in FIG. 2. Then, block area data consisting of attribute, color, layout, and binary information is determined and stored. The block area data may be displayed on the display unit 84 after laying them out together with a rectangle representing the block as shown in FIG. 2 or may be printed using the printer 85. The data may also be output as text information according to a text format without the use of the layout in FIG. 2. The block area data may be output for all blocks contained in the designated or currently selected document or only instructed blocks. FIG. 7 shows an example of the structure of block area data. The area discriminating processing carried out by the area discriminating portion 4 will be described below in detail. Based on the binary information, the character recognizing portion 6 recognizes the characters in the image contained in a block the attribute of which has been determined as a text in the area discriminating portion 4, and outputs an input image, block area data, and a text for the results of character recognition to the printer 85, the display unit 84, or the network 87. In addition, an application capable of executing a filing function can store the output data in another terminal connected via the MEM 83, the external storage means 88, and the communication interface 87, as file data in a format that allows the data to be subsequently retrieved. By invoking the saved data using index, keyword, image, or layout retrieval, the input image, layout information, or text can be reproduced by the display unit or the printer.

The area discriminating processing executed by the area discriminating portion 4 will be described in detail.

FIG. 3 is a flowchart showing the flow of area discriminating processing executed by the area discriminating portion 4.

S302 is a routine for converting an input color image into a gray image. The image can be converted by executing a calculation using an equation that derives illuminance information by, for example, applying predetermined weights to RGB information contained in n-bit data representing the color of each pixel in an input image, as represented by Equation (1).

The weighting used in Equation (1) is only an example, and may be determined depending on the color characteristics of the image inputting means or values set by the operator. In addition, even if the data is not RGB information but YMC information, it can be converted into illuminance information by applying a weight to each value of YMC, as in Equation (1).

$$\text{Illuminance signal}=0.30R+0.59G+0.11B \quad (1)$$

At step S302, Equation (1) is used to convert the color data on each pixel into gray data for all pixels of a processed image. The gray data is stored in the MEM 83 as original data for area discriminating processing so as to correspond to each pixel. It remains stored until the processing in FIG. 3 is finished, and then it is deleted.

At step S304, the entire image of the original data stored in the MEM 83 at step S302 is set as an initial retrieving area. This setting step stores in the MEM 83 a pointer indicating the position at which the retrieved image is stored and area data consisting of coordinates (the coordinates of two points that are diagonal points) representing a particular area in the image. The "retrieval", as used herein, refers to processing for detecting a uniform binary density area larger than or equal to a predetermined area, and is represented by step S308. The "retrieving area" refers to an object area for retrieving at step S308.

S308 uses various thresholds to binarize the original data on the gray image of the currently set retrieving area and retrieves uniform binary density areas from the binarized image. The details of this processing is shown in the flowchart in FIG. 4 and described below. The processing in step S308 can retrieve as a uniform binary density area that part of the retrieving area of the gray image generated at step S302 which appears to be filled with the same color as a background and can store it in the MEM 83.

At step S312, it is determined whether one or more uniform binary density areas were retrieved from the currently set retrieving area at step S308. If so, the process proceeds to step S316, where it is determined which of the areas stored at step S308 has the largest area and where this area is set as a new retrieving area. At this point, since the area set as the current retrieving area and the largest area determined at step S316 have a parent-child relationship, information that associates these two areas together is stored in the MEM 83 for use in step step S334.

Step step S316 updates the area data set in the MEM 83 at step S304, to area data on the new area.

When the area is set at step S316, the process returns to step S308. The original data on the gray image of this new retrieving area is subjected to area retrieval processing.

Repeating steps S312, S316, and S308 enables area retrieval in sequentially smaller ranges.

If step S312 determines that no uniform binary density area was retrieved from the currently set retrieving area at step S308, the process passes to step S320 to adaptively binarize the image of the retrieving area. The adaptive binarization is executed for gray images stored in the MEM 83 by discriminating surface objects from background objects and carrying out binarization based on the discrimination information. The details of this processing are shown in the flowchart in FIG. 6 and are described below. Adaptively binarized image data is stored in the bit map data in the MEM 83 and at the corresponding pixel position independent of the input multi-valued image and the gray image.

Identification information on the area adaptively binarized at step S320 is stored in the MEM 83 in order to prevent this area from being subjected to area retrieval processing or adaptive binarization processing (S324). The identification information for the adaptive binarization process end can be used to indicate whether the area has been adaptively binarized, by providing in the MEM 83 a bit map data storage area of the same size (that is, having the same number of pixels) as the gray image generated at step S302, setting all pixels to "1" as an initial condition, and changing the pixels adaptively binarized at step S320 to "0" to allow the bit map data to function as a mirror image.

S330 determines whether the current retrieving area is largest. This step determines whether there is any area that has not been adaptively binarized, and retrieves adaptive binarization process end information from the MEM 83 to determine whether there remains any pixel of "1". If step S330 determines that all areas have been adaptively binarized, the process proceeds to step S340 to execute block discrimination processing. The details of this processing are shown in the flowchart in FIG. 7 and are described below. If step S330 determines that there is an area that has not been adaptively binarized, the process transfers to step S334.

At step S334, the area set as the current retrieving area is expanded by one step. This processing obtain the smallest uniform binary density area including the current retrieving area. This processing can also be executed by referencing the association information stored in the MEM 83 at step S316 that associates the parent and child areas together. In the example of FIG. 2, when the current retrieving area has a block number 2, the area expanded by one step has a block number 1.

After the area to be expanded by one step has been obtained at step S334, that part of this area which has not been binarized is set as the next retrieving area at step S338. This processing compares the area data on the area obtained at step S334 with the identification information in the MEM 83 and stores that part of the area obtained at step S334 which has identification information of 1, in the area data storage area of the MEM 83 for the retrieving area. This in turn sets the area of the image that is obtained at step S334 and has not been adaptively binarized as the retrieving area that is retrieving at the next step S308. In FIG. 2, when the current retrieving area has a block number 2, the area expanded by one step has a block number 1. The area set at step S338 is obtained by excluding the area with the block number 2 from the area with the block number 1.

Figure 4:
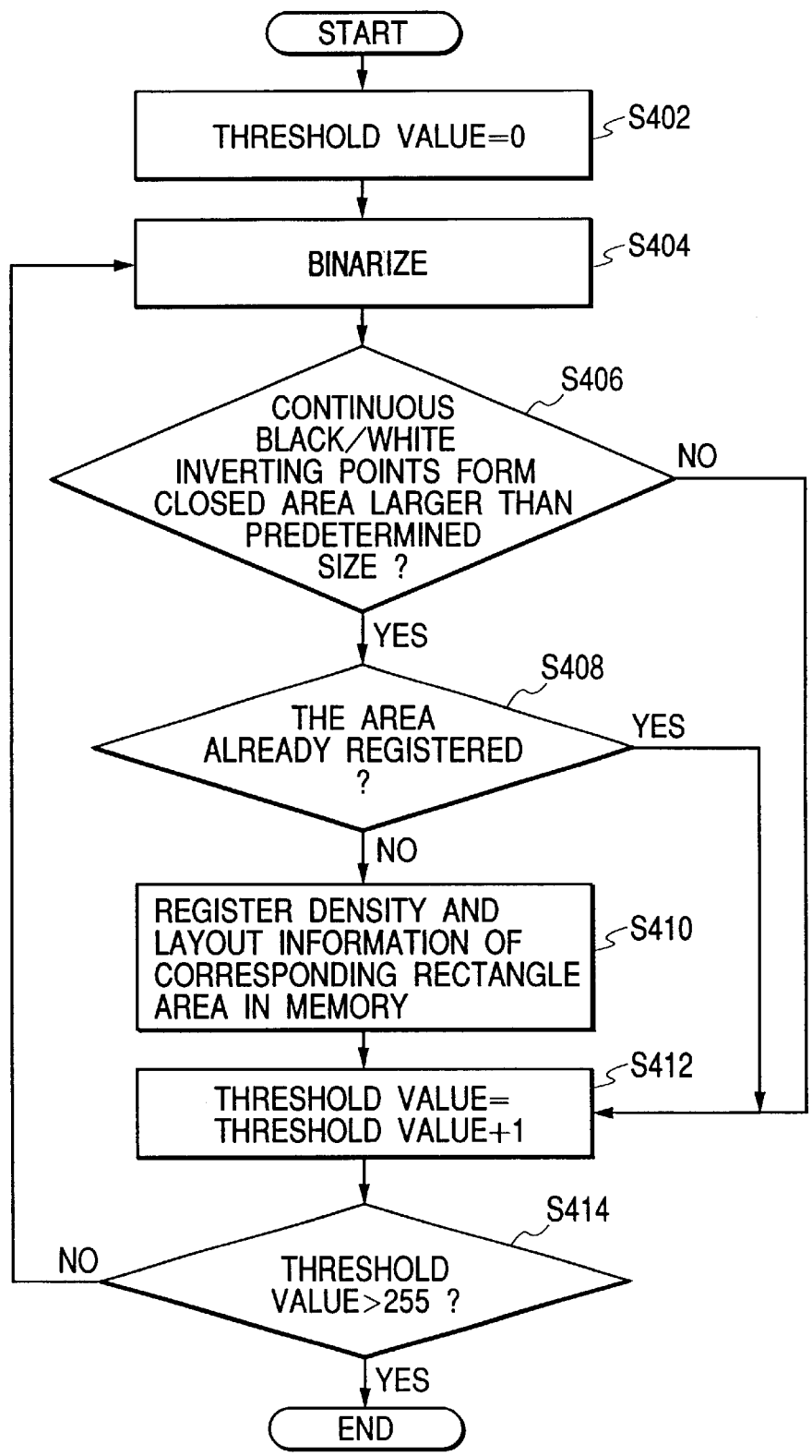
FIG. 4 is a flowchart of the retrieval of a uniform binary density area.

The processing for retrieving uniform binary density areas at step S312 is described according to the flowchart in FIG. 4.

At step S402, a threshold for binarization executed in this processing is set to the initial value of 0. The threshold is stored in the MEM 83 and updated in step S412.

At step S404, each pixel of the retrieving area of the gray image in the MEM 83 is binarized using the set threshold.

S406 determines whether there is any uniform binary density area in the image binarized at step S404. This processing retrieves an area having a mass of white or black pixels of a predetermined size or larger and can be implemented by determining whether continuous black/white inverting points form a closed area larger than or equal to a predetermined area size. The predetermined area size is stored in the MEM 83 beforehand but may be, for example, the mean font size of the characters used in texts. In addition, several parameters may be switched based on the operator's operation or the type of the manuscript.

If step S406 determines that there is no uniform binary density area, the process passes to step step S412. Otherwise, the process proceeds to step S408 to determine whether the area retrieving at step S406 is already registered in the MEM 83. This determination can be executed by comparing the area information registered in the MEM 83 at step S410 with the area information retrieved at step S406 to determine whether there is any match. This comparison is executed for the areas retrieved during the series of steps S402 to S414 for a single retrieving area.

If step S408 determines that the retrieved area has been registered, the process passes to step S412, and otherwise, it transfers to step S410 to register the area information in the MEM 83. The area information is density information used as a binarized threshold when the relevant area is retrieved and positional information required to identify the area. If the area is, for example, a rectangle, this information is the coordinates of two points consisting of diagonal points, or one point and area size information. Alternatively, if the area has a complicated shape, this information may indicate border lines.

S412 increments the threshold by one and step S414 determines whether the threshold has exceeded 255. The processing in step S414 determines whether the uniform binary density area retrieval processing shown in the flowchart in FIG. 4 has been executed for all densities. In addition, this example determines whether the threshold has exceeded 255 because the density of each pixel of the gray image is represented using 8 bits, because 256 gradients are used, and because the threshold is incremented by one at step S412. This determination, however, depends on the possible density value and the addition width for the threshold in step S412. It may be determined whether the maximum value of the threshold has been exceeded. The addition width for the threshold in step S412 may be switched depending on a designation by the operator or the determined type of the manuscript, and the threshold may be incremented by, for example, 8 or 16. The use of a smaller addition width in step S412 allows a uniform binary density area to be retrieved more precisely, thereby enabling the uniform binary density area to be discriminated from the different part of the image despite the similarity of their colors.

If step S414 determines that the threshold has not exceeded 255, the process returns to step S404 to execute binarization using the new threshold set at step S412.

Figure 5:
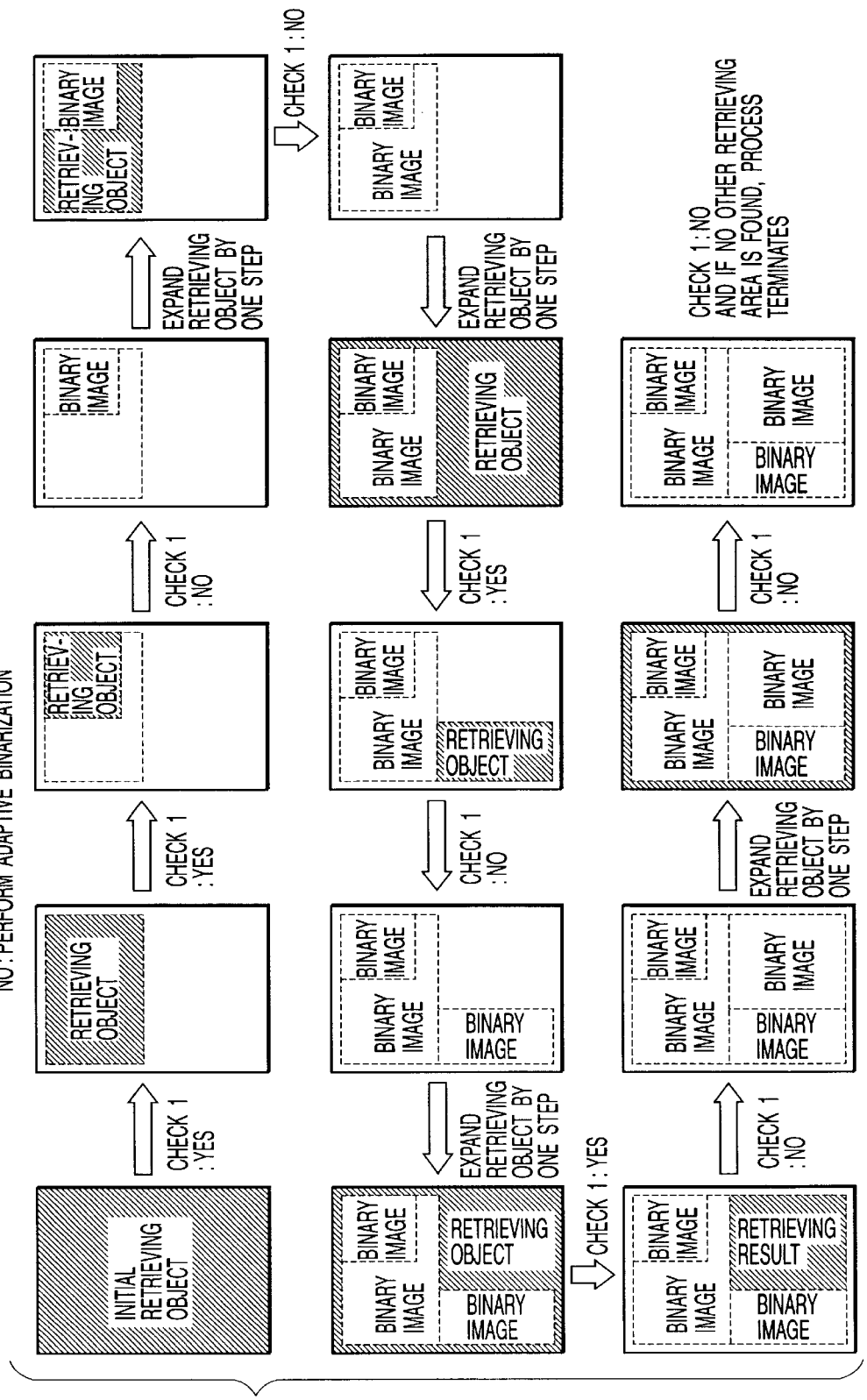
FIG. 5 describes the process of area discriminating processing.

FIG. 5 describes the flow of the area discriminating processing using a specific example.

This figure shows the process of binarization using as an example the text shown in FIG. 2.

Check 1 in this figure corresponds to the retrieval of uniform binary density areas in step S308 and step S312 in the flowchart in FIG. 3.

As described above, uniform binary density areas larger than or equal to a predetermined size are recursively retrieved according to the flowchart in FIG. 3 to enable areas of the same background color to be reliably extracted from the image. In addition, the size of the retrieving object is limited to avoid useless retrievals in order to increase the processing speed.

Figure 6:
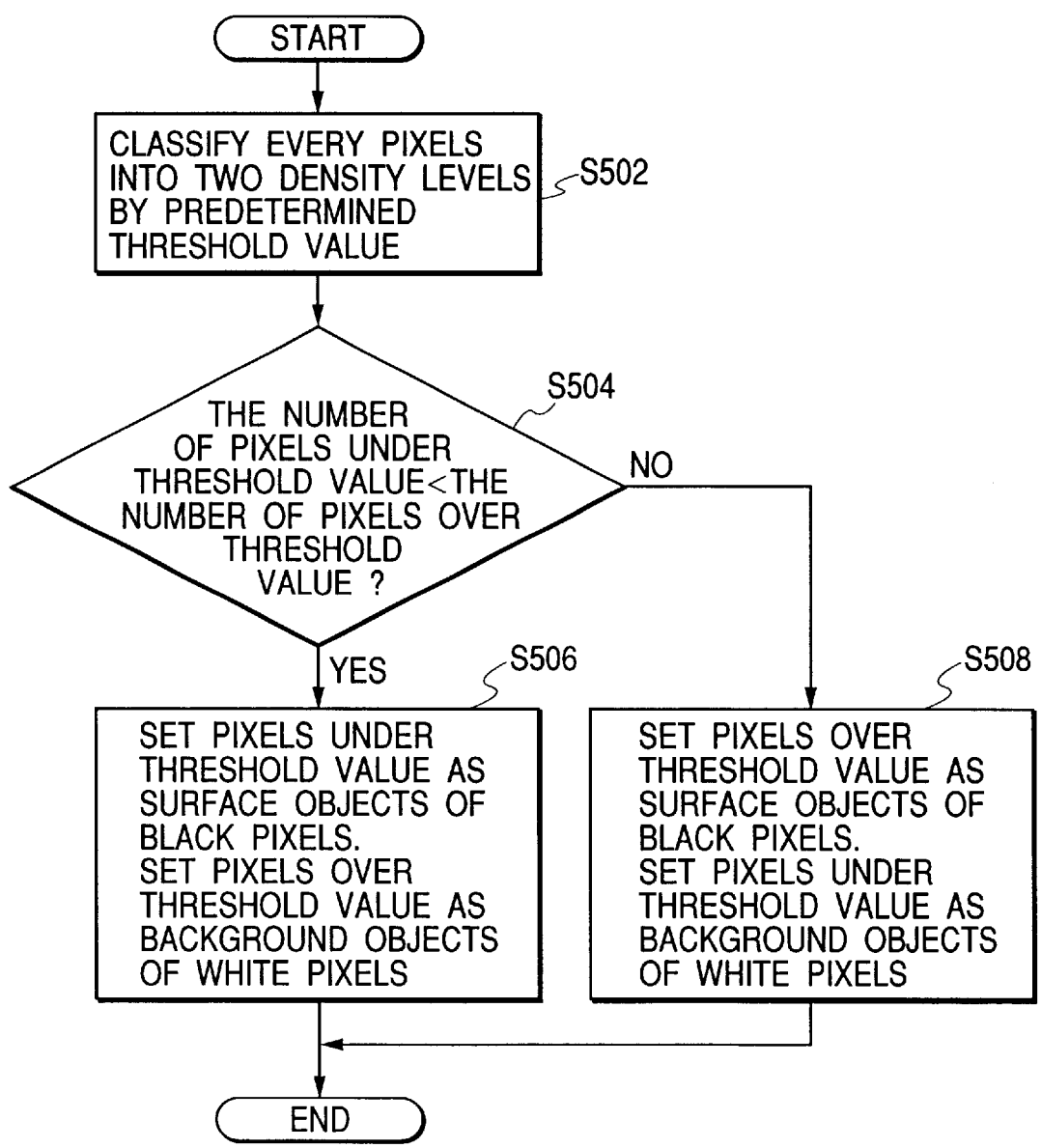
FIG. 6 is a flowchart of adaptive binarization processing.

FIG. 6 shows a flowchart representing the flow of processing executed by the adaptive binarization routine step S320.

S502 is a routine for classifying each pixel into two density levels using an adaptive-binarization threshold. This processing compares the density of each pixel of the gray image of the retrieving area stored in the MEM 83 with the adaptive-binarization threshold to determine whether the density is less than the threshold or more than or equal to the threshold. Step S504 compares the number of pixels determined to be less than the threshold at step S502 with the number of pixels determined to be more than or equal to the threshold. If the number of pixels is less than the threshold, the process transfers to step S506, and otherwise, it proceeds to step S508. The zero level of the input illuminance signal represents white, while the maximum level represents black.

S506 is a routine for determining a pixel less than the threshold as a surface object to treat it as a black pixel while determining a pixel more than or equal to the threshold as a background object to treat it as a white pixel. This processing sets the density data on each pixel of the gray image of the retrieving area in the MEM 83, to "1" (a black pixel) or "0" (a white pixel) to generate a new binary image and stores the image in the MEM 83.

S508 is a routine for determining a pixel more than or equal to the threshold as a surface object to treat it as a black pixel while determining a pixel less than the threshold as a background object to treat it as a white pixel. This processing sets the density data on each pixel of the gray image of the retrieving area in the MEM 83, to "1" (a black pixel) or "0" (a white pixel) to generate a new binary image and stores the image in the MEM 83.

The adaptive binarization routine described in the flowchart in FIG. 6 compares the binary density in the block with the threshold to determine a pixel less than the threshold as a surface object while determining a pixel more than or equal to the threshold as a background object. This is because the top priority is given to the determination of characters as surface objects. Consequently, this processing reliably discriminates inverted characters as surface objects to substantially improve the character recognition accuracy.

FIG. 7 shows a flowchart representing the flow of processing executed by a block discriminating routine at step S340.

S602 is a routine for reading the results of adaptive binarization stored in the MEM 83 at step S506 or step S508 and treats as a single image, the areas of the entire manuscript image processed at step S302.

Step S604 is a routine for extracting blocks based on the results of adaptive binarization read at step S602 in order to set a number and attribute and layout information for each block. This processing-analyzes the arrangement of the black pixels in the binary image and extracts block areas of the same attribute to determine the attribute of each block, that is, a text, a table, a figure, or an image. This processing can be implemented by applying the block selection technique described in, for example, Japanese Patent Application Laid-Open No. 6-068301.

S606 is a routine for determining that the relevant information is to be set for the first block extracted at step S604 according to the block numbers set at step S604.

Steps S608 and S610 are routines for setting color information for the block. Step S608 determines as a surface color, the mean color of the area stored in the MEM 83 and corresponding to the adaptively binarized black pixel area from the original color image stored in the MEM 83. Step S610 determines as a background color, the mean color of the area stored in the MEM 83 and corresponding to the adaptively binarized white pixel area from the original color image stored in the MEM 83.

Figure 8:
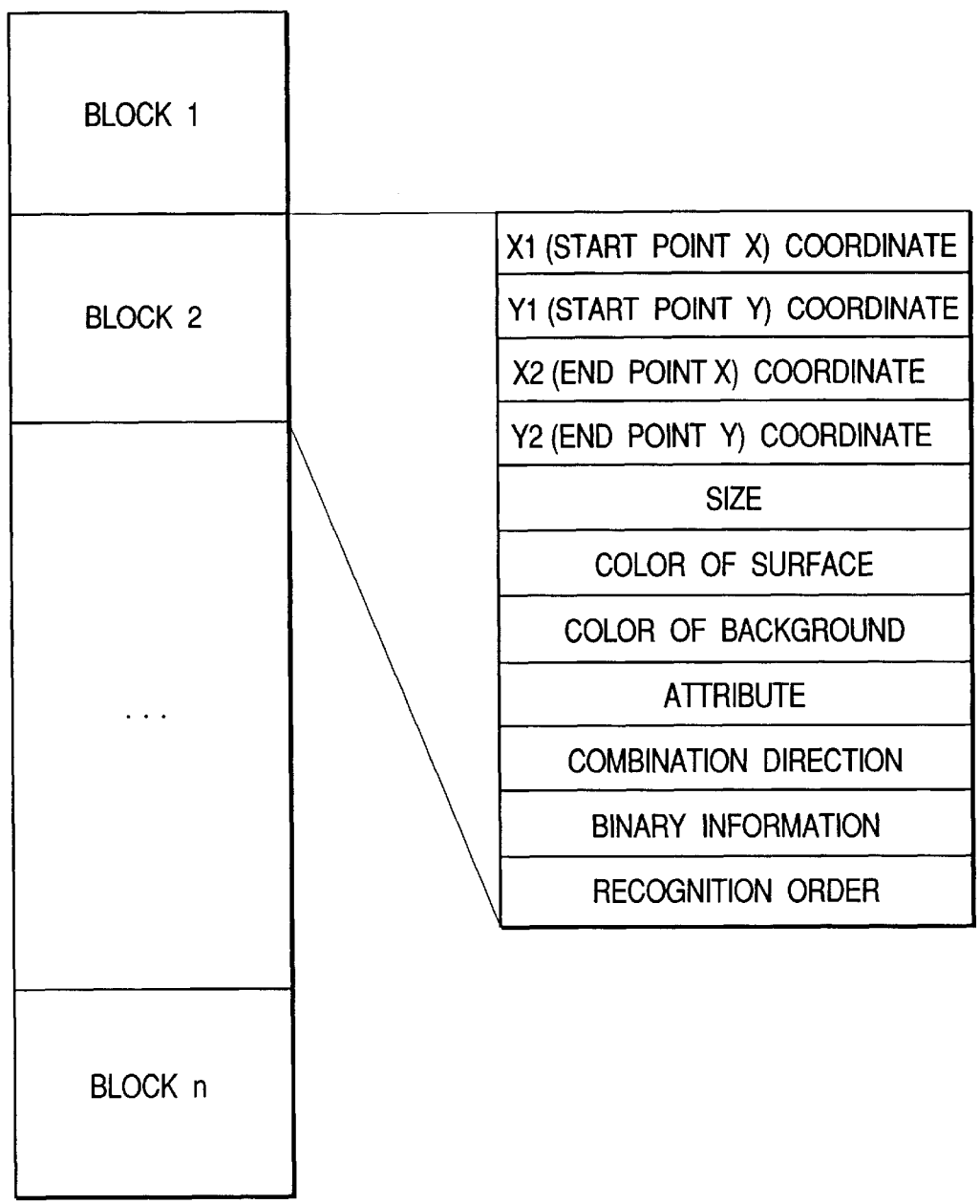
FIG. 8 illustrates a data format for block information.

S612 is a routine for setting relevant information (attribute, color, layout, and binary information) for the block using the above routines, and stores set information such as that shown in the example in FIG. 2, in the MEM 83 for each area as shown in FIG. 8. Although the figure shows the names of the colors as color information, the density level for each of R, G, and B is actually recorded. In addition, binary information is the results of the adaptive binarization for the block.

Step S614 is a routine for determining whether the block is final. If so, the process ends and otherwise, the process transfers control to step S616.

S616 is a routine for setting a next block of the current block as an object for setting various information.

The file function can be implemented by associating an input color image, a gray image, a binary image, and block information together for storage and further associating the image of a block determined to have a text attribute with a text resulting from character recognition for storage. Keywords used to invoke the filed data may be words or sentences contained in the text or layout information. If layout information is used as a keyword to invoke a file, information such as a position and an attribute or the attribute and number of blocks may be input and compared with the stored block information to display or print the image or text in a matching file.

As described above, the present invention recursively retrieves uniform binary density areas to enable areas of the same background color to be extracted even from documents with a colored background or inverse characters. It also designates retrieving areas of a minimum size to avoid useless retrievals in order to achieve a sufficiently practical processing speed. Furthermore, this invention reliably identifies a main object, binarizes it, and adds a color attribute to it to enable the accuracy of subsequent image conversions to be substantially improved. In particular, this invention enables the true character recognition of colored documents taking color information into account, thereby noticeably contributing to the efficient processing of complicated documents.

Although the above description converts a color image into an illuminance signal, this invention is not limited to this aspect, and each of R, G, and B may be adaptively binarized and the resulting binary values may be executed OR operation (logical add) to obtain a binary output.

Although in the above description, the adaptive binarization routine compares the number of pixels less than the threshold with the number of pixels more than or equal to the threshold to identify the surface and the background, this invention is not limited to this aspect and the surface and the background may be discriminated using color information.

What is claimed is:

1. An image processing method comprising the steps of:
    inputting a multi-valued image as an initial retrieving area;
    converting the multi-valued image corresponding to the retrieving area into a binary image with a first threshold;
    retrieving areas from the binary image;
    registering information of the areas retrieved in said retrieving step; and
    repeating said converting, retrieving, and registering steps respectively, wherein for each repetition, the converting step converts the multi-valued image corresponding to the area retrieved in said retrieving step into a binary image with a different threshold.

2. A method according to claim 1, wherein the multi-valued image corresponding to the areas retrieved in said retrieving step have a same background color.

3. A method according to claim 1, wherein the retrieved areas are masses of white or black pixels of a predetermined size or larger.

4. A method according to, claim 1, wherein, for each repetition, said converting step converts the multi-valued image corresponding to the retrieving area into a plurality of binary images with a plurality of thresholds, and wherein said retrieving step retrieves the areas from the binary images on the basis of uniform binary density areas.

5. A method according to claim 4, wherein said plurality of thresholds are specified at a predetermined interval.

6. A method according to claim 1, wherein said retrieving step retrieves the areas from the binary image on a basis of uniform binary density areas.

7. A method according to claim 1, wherein the information of the areas registered in said registering step includes an attribute of the areas.

8. A method according to claim 7, wherein said attribute is information indicating that a type of the image is a text.

9. A method according to claim 7, wherein said attribute is information indicating that a type of the image is an image.

10. A method according to claim 7, wherein said attribute is information indicating that a type of the image is a line.

11. A method according to claim 1, wherein the information of the areas registered in said registering step includes positional information of the areas.

12. A method according to claim 11, wherein according to the positional information on the areas input as a retrieval condition, a corresponding image is retrieved, and wherein the retrieved image is output.

13. A method according to claim 1, further comprising the steps of:
    adaptively binarizing the multi-valued image based on the registered information;
    performing character recognition of the adaptively binarized image; and
    storing a result of the character recognition with the image.

14. A method according to claim 13, wherein according to a character code input as a retrieval condition, a corresponding image is retrieved, and wherein the retrieved image is output.

15. A method according to claim 1, further comprising the step of adaptively binarizing the multi-valued image based on the registered information,
wherein said adaptively binarizing step comprising the steps of:
for each of the areas, comparing a number of pixels less than a threshold with a number of pixels more than or equal to the threshold; and
determining background and surface pixels on a basis of results of said comparing step.

16. A method according to claim 15, wherein said adaptively binarizing step determines the pixels less than the threshold as background pixels when the number of pixels less than the threshold is more than the number of pixels more than or equal to the threshold, and determines the pixels more than or equal to the threshold as background pixels when the number of pixels more than or equal to the threshold is more than the number of pixels less than the threshold.

17. A method according to claim 1, further comprising the steps of:
adaptively binarizing the multi-valued image based on the registered information; and
performing character recognition of the adaptively binarized image.

18. A method according to claim 1, further comprising step of compressing the multi-valued images based on the information.

19. A method according to claim 1, further comprising steps of:
adaptively binarizing the multi-valued image based on the registered information, and
form recognizing the adaptively binarized image.

20. A method according to claim 1 further comprising the steps of:
converting a color image into a gray image; and
storing the color image with the information of the areas,
wherein the input multi-valued image is the converted gray image.

21. An image processing apparatus comprising:
inputting means for inputting a multi-valued image as an initial retrieving area;
converting means for converting the multi-valued image corresponding to the retrieving area into a binary image with a first threshold;
retrieving means for retrieving areas from the binary image;
registering means for registering information of the areas retrieved by the retrieving means; and
repeating means for repeating the converting, retrieving, and registering, respectively, by the converting means, retrieving means and registering means, wherein for each repetition, the converting means converts the multi-valued image corresponding to the area retrieved by the retrieving means into a binary image with a different threshold.

22. An apparatus according to claim 21, wherein the multi-valued image corresponding to the areas retrieved by the retrieving means have a same background color.

23. An apparatus according to claim 21, wherein the retrieved areas are masses of white or black pixels of a predetermined size or larger.

24. An apparatus according to claim 21, wherein, for each repetition of the repeating means, the converting means converts the multi-valued image corresponding to the retrieving area into a plurality of binary images with a plurality of thresholds, and
wherein said retrieving means retrieves the areas from the binary images on a basis of uniform binary density areas.

25. An apparatus according to claim 24, wherein said plurality of thresholds have a predetermined interval.

26. An apparatus according to claim 21, wherein, the retrieving means retrieves the areas from the binary image on a basis of uniform density areas.

27. An apparatus according to claim 21, wherein, the information of the areas registered by the registering means includes an attribute of the areas.

28. An apparatus according to claim 27, wherein said attribute is information indicating that a type of the image is a text.

29. An apparatus according to claim 27, wherein said attribute is information indicating that a type of the image is an image.

30. An apparatus according to claim 27, wherein said attribute is information indicating that a type of the image is a line.

31. An apparatus according to claim 21, wherein, the information of the areas registered by the registering means includes positional information.

32. An apparatus according to claim 31, wherein, according to the positional information on the areas input as a retrieval condition, a corresponding image is retrieved, and wherein the retrieved image is output.

33. An apparatus according to claim 21, further comprising:
adaptive binarizing means for adaptively binarizing the multi-valued image based on the registered information;
character recognition means for performing character recognition of the adaptively binarized image; and
storage means for storing a result of the character recognition with the image a type of the image is a text.

34. An apparatus according to claim 33, wherein, according to a character code input as a retrieval condition, a corresponding image is retrieved, and wherein the retrieved image is output.

35. An apparatus according to claim 21, further comprising:
adaptive binarizing means that adaptively binarizes the multi-valued image based on the registered information,
wherein the adaptively binarizing means comprises:
comparing means that, for each of the areas, compares a number of pixels less than a threshold with a number of pixels more than or equal to the threshold; and
determining means for determining background and surface pixels on a basis of results of the comparing means.

36. An apparatus according to claim 35, wherein the adaptive binarizing means determines the pixels less than the threshold as background pixels when the number of pixels less than the threshold is more than the number of pixels more than or equal to the threshold, and determines the pixels more than or equal to the threshold as background pixels when the number of pixels more than or equal to the threshold is more than the number of pixels less than the threshold.

37. An apparatus according to claim 21, further comprising:
   adaptive binarizing means for adaptively binarizing the multi-valued images based on the registered information; and
   character recognition means for performing character recognition of the adaptively binarized image.

38. An apparatus according to claim 21, further comprising compression means for compressing the multi-valued images based on the information.

39. An apparatus according to claim 21, further comprising:
   adaptive binarizing means for adaptively binarizing the multi-valued image based on the registered information; and
   form recognizing means for form recognizing the adaptively binarized image.

40. An image processing apparatus according to claim 21, further comprising:
   converting means for converting a color image into a gray image; and
   storing means for storing the color image with the information of the areas,
   wherein, the input multi-valued image is the converted gray image.

41. A storage medium storing a program, the program comprising the steps of:
   inputting a multi-valued image as an initial retrieving area;
   converting the multi-valued image corresponding to the retrieving area into a binary image with a first threshold;
   retrieving areas from the binary image;
   registering information of the areas retrieved in the retrieving step; and
   repeating the converting, retrieving, and registering steps respectively, wherein for each repetition, the converting step converts the multi-valued image corresponding to the area retrieved in the retrieving step into a binary image with a different threshold.

42. A storage medium according to claim 41, wherein the multi-valued image corresponding to the areas retrieved in the retrieving step have a same background color.

43. A storage medium according to claim 41, wherein the retrieved areas are masses of white or black pixels of a predetermined size or larger.

44. A storage medium according to claim 41, wherein, for each repetition, the converting step converts the multi-valued image corresponding to the retrieving area into a plurality of binary images with a plurality of thresholds, and wherein the retrieving step retrieves the areas from the binary images on a basis of uniform binary density areas.

45. A storage medium according to claim 44, wherein said plurality of thresholds have a predetermined interval.

46. A storage medium according to claim 41, wherein the retrieving step retrieves the areas from the binary image on a basis of uniform binary density areas.

47. A storage medium according to claim 41, wherein the information of the areas registered in the registering step includes an attribute of the areas.

48. A storage medium according to claim 47, wherein said attribute is information indicating that a type of the image is a text.

49. A storage medium according to claim 47, wherein said attribute is information indicating that a type of the image is an image.

50. A storage medium according to claim 47, wherein said attribute is information indicating that a type of the image is a line.

51. A storage medium according to claim 41, wherein the informaiton of the areas registered in the registering step includes positional information of the areas.

52. A storage medium according to claim 51, wherein, according to the position information on the areas input as a retrieval condition, a corresponding image is retrieved, and wherein the retrieved image is output.

53. A storage medium according to claim 41, further comprising the steps of:
   adaptively binarizing the multi-valued image based on the registered information;
   performing character recognition of the adaptively binarized image; and
   storing a result of the character recognition with the image.

54. A storage medium according to claim 53, wherein, according to a character code input as a retrieval condition, a corresponding image is retrieved, and wherein the retrieved image is output.

55. A storage means according to claim 41, further comprising
   the step of adaptively binarizing the multi-valued image based on the registered information,
   wherein the adaptively binarizing step comprises the steps of:
   for each of the areas, comparing a number of pixels less than a threshold with a number of pixels more than or equal to the threshold; and
   determining background and surface pixels on a basis of results of the comparing step.

56. A storage medium according to claim 55, wherein the adaptively binarizing step determines the pixels less than the threshold as background pixels when the number of pixels less than the threshold is more than the number of pixels more than or equal to the threshold, and determines the pixels more than or equal to the threshold as background pixels when the number of pixels more than or equal to the threshold is more than the number of pixels less than the threshold.

57. A storage medium according to claim 41, further comprising the steps of:
   adaptively binarizing the multi-valued imaged based on the registered information; and
   performing character recognition of the adaptively binarized image.

58. A storage medium according to claim 41, further comprising the step of compressing the multi-valued images based on the information.

59. A storage medium according to claim 41, further comprising the steps of:
   adaptively binarizing the multi-valued image based on the registered information; and
   form recognizing the adaptively binarized image.

60. A storage medium according to claim 41, further comprising the steps of:
   converting a color image into a gray image; and
   storing the color image with the information of the areas,
   wherein the input multi-valued image is the converted gray image.

* * * * *

UNITED STATES PATENT AND TRADEMARK OFFICE
CERTIFICATE OF CORRECTION

PATENT NO. : 6,327,382 B1
DATED : December 4, 2001
INVENTOR(S) : Kaneda et al.

It is certified that error appears in the above-identified patent and that said Letters Patent is hereby corrected as shown below:

Column 4,
Line 13, "step" (second occurrence) should be deleted;
Line 14, "step" (second occurrence) should be deleted; and
Line 58, "obtain" should read -- obtains --.

Column 8,
Line 31, "to," should read -- to --.

Column 10,
Line 41, "a type of the image is a text" should be deleted.

Column 12,
Line 24, space after "comprising" should be deleted;
Line 25, space before "the" (first occurrence) should be deleted; and
Line 46, "imaged" should read -- image --.

Signed and Sealed this

Tenth Day of September, 2002

Attest:

JAMES E. ROGAN
Attesting Officer  Director of the United States Patent and Trademark Office

UNITED STATES PATENT AND TRADEMARK OFFICE
CERTIFICATE OF CORRECTION

PATENT NO.     : 6,327,382 B1
DATED          : December 4, 2001
INVENTOR(S)    : Kaneda et al.

It is certified that error appears in the above-identified patent and that said Letters Patent is hereby corrected as shown below:

Column 4,
Line 13, "step" (second occurrence) should be deleted;
Line 14, "step" (second occurrence) should be deleted; and
Line 58, "obtain" should read -- obtains --.

Column 8,
Line 31, "to," should read -- to --.

Column 10,
Line 41, "a type of the image is a text" (as deleted in Certificate of Correction September 10, 2002) should be reinstated Column 12,
Line 24, space after "comprising" should be deleted;
Line 25, space before "the" (first occurrence) should be deleted; and
Line 46, "imaged" should read -- image --.

This certificate supersedes Certificate of Correction issued September 10, 2002.

Signed and Sealed this

Fourth Day of February, 2003

JAMES E. ROGAN
*Director of the United States Patent and Trademark Office*